United States Patent [19]
de Judicibus

[11] Patent Number: 6,163,317
[45] Date of Patent: Dec. 19, 2000

[54] METHOD AND APPARATUS FOR DYNAMICALLY GROUPING OBJECTS

[75] Inventor: Darlo de Judicibus, Rome, Italy

[73] Assignee: International Business Machines Corporation, Armonk, N.Y.

[21] Appl. No.: 09/062,630

[22] Filed: Apr. 17, 1998

[30] Foreign Application Priority Data

Apr. 19, 1997 [GB] United Kingdom .................... 9707945

[51] Int. Cl.$^7$ ....................................................... G06F 13/00
[52] U.S. Cl. ............................................ 345/334; 345/356
[58] Field of Search ...................................... 345/352, 334, 345/333, 339, 342, 353, 146, 348, 349, 350, 351, 332

[56] References Cited

U.S. PATENT DOCUMENTS 5,420,978  5/1995  Tozawa et al. ........................ 345/334
5,745,718  4/1998  Cline et al. ............................ 345/352
5,809,297  9/1998  Kroenke et al. ........................ 395/613

OTHER PUBLICATIONS

IBM Technical Disclosure Bulletin, "Dynamic icon Navigation to Nested Containers", vol. 34, No. 8, pp. 386–388, Jan. 1992.

*Primary Examiner*—Raymond J. Bayerl
*Assistant Examiner*—Tadesse Hailu
*Attorney, Agent, or Firm*—Karl O. Hesse

[57] ABSTRACT

In a graphical user interface, a method for automatically subdividing the objects and for grouping the objects into folders or container objects and for representing these folders instead of the associated objects. The grouping is based on one or more of the attributes of the objects, e.g. the object name, the size, the last update. The grouping is particularly useful when many objects are to be represented and it would be difficult to handle all the objects and to display them on the desktop. Nested groups can be created inside other groups when needed.

10 Claims, 3 Drawing Sheets

METHOD AND APPARATUS FOR DYNAMICALLY GROUPING OBJECTS

BACKGROUND OF THE INVENTION

1. Field of the Invention

The present invention relates to a graphical user interface and particularly to a system and method for dynamically grouping objects in a graphical user interface.

2. Description of the Related Art

Data processing systems are usually provided with a graphical user interface (GUI) to allow a user to control the data processing system and to present the results of user actions on the system display. In a graphical user interface, applications and data are generally presented as objects depicted on a user interface. A user is then provided with a graphical, intuitive interface to a complex data processing system which permits graphic selection of depicted objects and manipulation of applications corresponding to those objects.

It is usually possible to simultaneously execute several software applications. The execution of multiple applications simultaneously is often referred to as "multitasking". It is desirable in such environments to allow the user to view some or all of the applications simultaneously. This is often accomplished by the utilization of the concept of "windows" wherein all or part of multiple applications are displayed in separate viewports of a computer system video display system. It is known to have multiple software applications present on a computer display simultaneously, one or more of which may be active at any given time, and which may be displayed in a window or icon.

There may be several windows simultaneously present on the desktop with each window displaying information that is generated by a different application program. Each application program presents information to the user through its window by drawing images, graphics or text within the window region. The user, in turn, communicates with the application by pointing at graphical objects in the window with a pointer that is controlled by a pointing device, such as a mouse, and then selecting the objects, or by typing information via a keyboard associated with the monitor. Selection of the objects may be effected by actuating the mouse to move the pointer onto or near the objects and pressing and quickly releasing, i.e. clicking, a button on the mouse, or by manipulating a cursor via the keyboard.

These user interface objects may be easily manipulated utilizing a standard set of interface commands. For example, the user may move the objects around on the display screen, change their sizes and appearances, shrink down a window to a so-called icon, rearrange the objects with respect to their relative background/foreground position so as to arrange the desktop in a convenient manner, etc.

There are a number of different graphical user interface environments commercially available which utilize the arrangement described above. These environments include the System 7 operating system developed by Apple Computer, Inc. (System 7 is a trademark of Apple Computer, Inc.), the Windows graphical user interface developed by the Microsoft Corporation (Windows is a trademark of Microsoft Corporation) and the OS/2 Presentation Manager developed by International Business Machines Corporation (OS/2 and Presentation Manager are trademarks of International Business Machines Corporation).

A problem in a graphical user interface is that when several applications are opened simultaneously, the desktop may assume a cluttered appearance. Most GUI provide users with the possibility of grouping objects and placing them inside other objects represented as folders. There are usually two different ways for creating such groups: by static definition or by mapping. Statically defined groups are, for example, the Windows 3.x Groups or the OS/2 Warp Folders. These groups can be created by an application, for example an installation program, or by the user creating, moving or copying objects directly into the group. Mapped groups represents physical data available through the system, usually arranged as a hierarchy. For example a file system or a representation of a network. Unlike statically defined groups, the mapped groups cannot be modified by the user without modifying the corresponding physical elements. On the other hand these mapped groups are continuously updated to match any change in the physical hierarchy.

It is obvious that a group with too many objects is not convenient to handle, because it is more laborious to retrieve a specific object when the group is open. Furthermore a group with a lot of objects takes more time to appear on the screen, especially when some automatic ordering is requested when presenting objects.

For the above reasons, when a group contains many objects it is advisable to create nested sub-groups, each containing a portion of the objects, in order to make it easier retrieve and access the single objects. In the state of the art operating system, this requires a manual intervention by the user or the creation of statically defined groups by a program. Anyway the sub-groups so created should be maintained when the number of objects increases in order to avoid again having too many objects in a single group. Often this requires a rearrangement of all the groups and laborious maintenance operations.

It is an object of the present invention to provide a technique which alleviates the above drawbacks.

SUMMARY OF THE INVENTION

According to the invention we provide, in a graphical user interface for displaying a plurality of objects, each object having a set of attributes, a method for dynamically grouping the plurality of objects into at least one set, the method comprising the steps of:

defining a rule for selecting said at least one set of objects according to the value of at least one of said attributes;

associating each of said at least one set of objects with a container;

representing each of said at least one set of objects with the associated container.

Further, according to the present invention we provide a graphical user interface for displaying a plurality of objects, each object having a set of attributes, the graphical user interface comprising:

means for selecting at least one set of objects according to the value of at least one of said attributes;

means for associating each of said at least one set of objects with a container;

means for representing each of said at least one set of objects with the associated container.

BRIEF DESCRIPTION OF THE DRAWINGS

Various embodiments of the invention will now be described in detail by way of examples, with reference to accompanying figures, where.

While the invention will be described in connection with a preferred embodiment and process, the description is not intended to limit the invention to that embodiment. On the contrary, the invention is intended to cover all alternatives, modifications and equivalents as may be included within the spirit and scope of the invention as described by the appended claims.

DETAILED DESCRIPTION OF THE INVENTION

Figure 1:
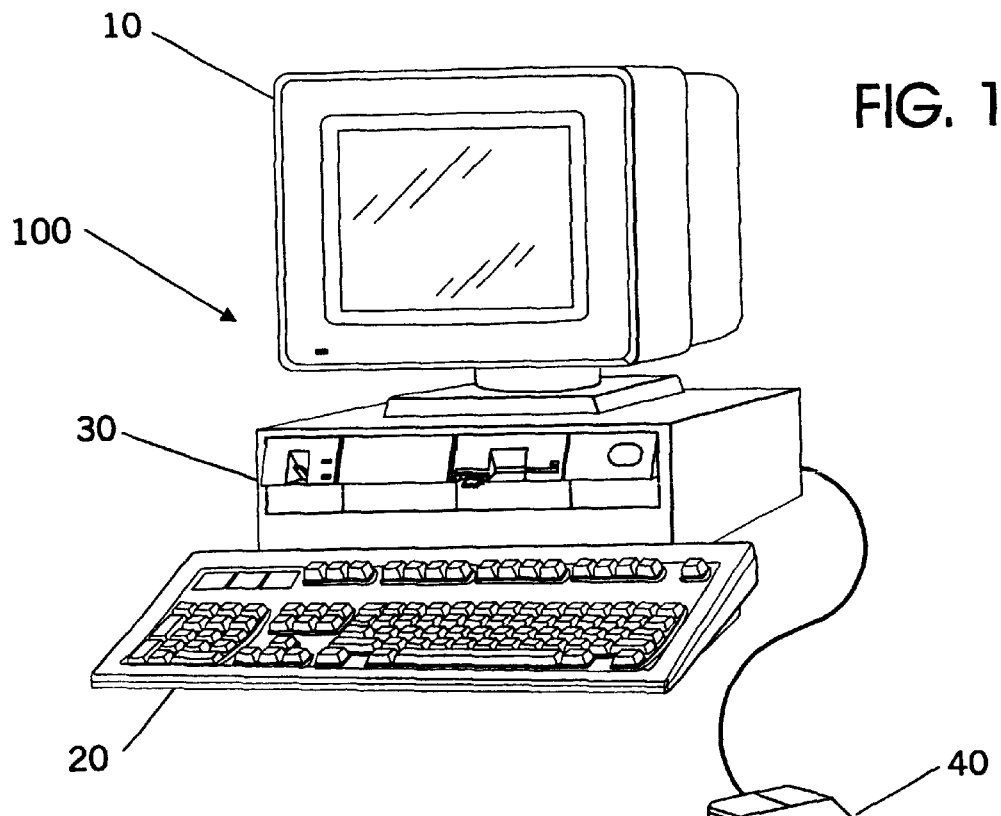
FIG. 1 shows schematically a computer which may be utilized to implement the method and system of the present invention.

With reference to FIG. 1, there is depicted a computer 100 which may be utilized to implement the method and system of the present invention. The computer 100 preferably includes a display unit 10 and a keyboard 20, coupled in a manner well known in the art. Additionally, the computer 100 includes a processor system unit 30 which may serve to mount a fixed disk drive and a diskette drive in addition to the main processor and memory. Further, in order to facilitate the utilization of a graphical user interface, computer 100 preferably includes a graphic pointing device, such as a mouse 40, which may be utilized to manipulate the position of a pointer (not shown) within a visual display on the screen 110.

Those skilled in the art will appreciate that computer 100 may be implemented utilizing any state-of-the-art personal computer, such as the Personal Computers manufactured by International Business Machines Corporation.

Figure 2:
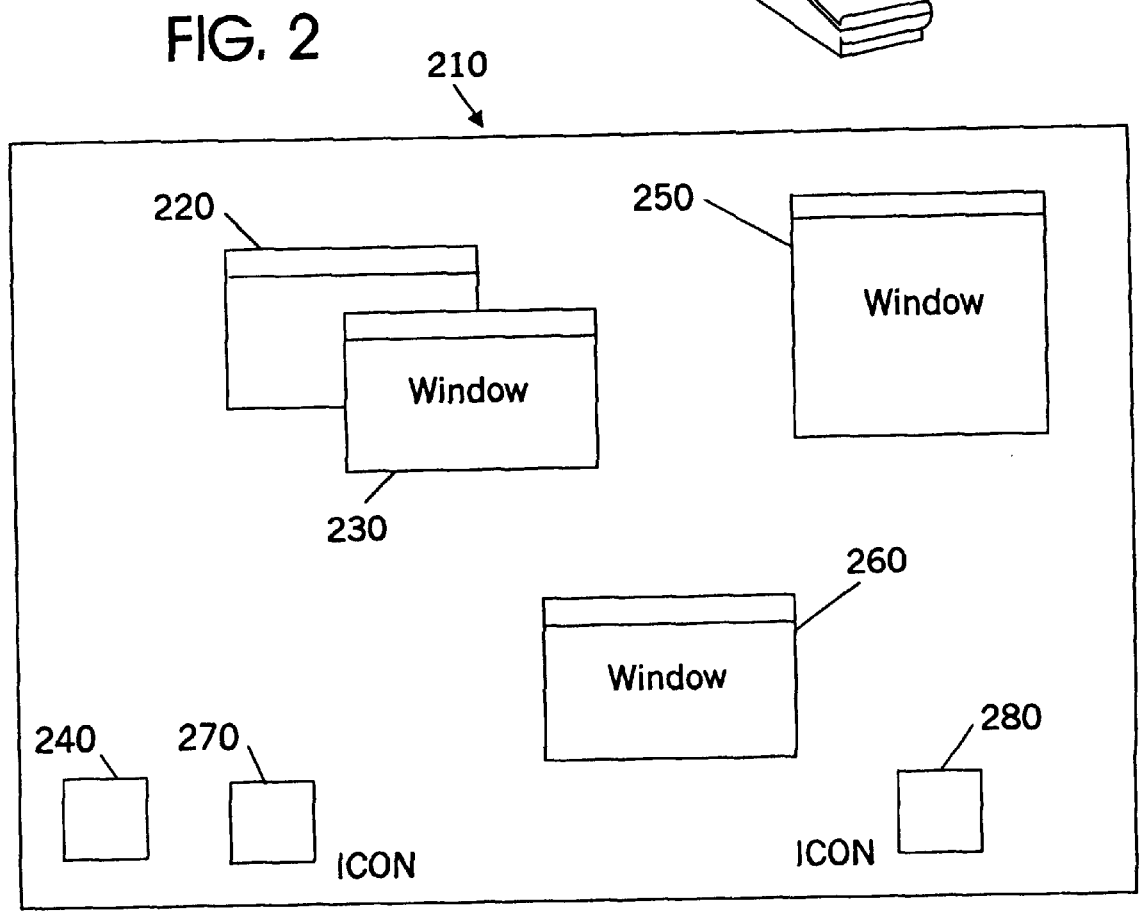
FIG. 2 shows schematically a graphical user interface used for the preferred embodiment of the present invention.

With regard now to FIG. 2, a graphical user interface which may be utilized to implement the method and system of the present invention is shown. The graphical display is typically arranged to resemble a single desktop 210. Execution of an application program involves one or more user interface objects represented by windows 220, 230 and icons 240. Typically, there may be several other windows 250, 260 and icons 270, 280 simultaneously present on the desktop and displaying information that is generated by different applications.

The window environment is generally part of the operating system software that includes a collection of utility programs for controlling the operation of the computer system 100. The operating system, in turn, interacts with application programs to provide higher level functionality, including a direct interface with the user. Specifically, the application programs make use of operating system functions by issuing task commands to the operating system which then performs the requested task. For example, an application program may request that the operating system display certain information on the window 220 for presentation to the user.

As mentioned above, most operating systems (e.g. Windows or OS/2) allows the user to group objects together and place them inside other objects usually represented as folders. Some of these groups may be nested inside each other.

According to a preferred embodiment of the present invention a dynamic grouping of objects is released. This means that, instead of mapping a fixed hierarchy or statically defining groups, a logic is associated to each group which can be used to dynamically build nested groups inside the main group.

An easy and obvious example of grouping logic can be alphabetic order. In such case the specification "group objects by the first character of name" would be associated to a group. The system, according to a preferred embodiment, creates in this case, inside the main container group, a nested group for each existing initial character. Let's suppose that the 13 objects: "April", "Barbara", Betty", "Charlie", "Chen", "Dario", "Fred", "Fernandez", "Linus", "Li", "Marco", "Sophie", "Zac" exist; then nine groups will be created, i.e. the groups: "A", "B", "C", "D", "F", "L", "M", "S" and "Z".

Should a new object be created or moved into the main group it will be automatically put in the corresponding character group if it already exists; otherwise a new group for the initial character of the new object will be created. On the other hand should a group lose all the associated objects, it would be automatically deleted.

Of course any other logic for sub-dividing the objects would be acceptable. Other example could be the object type: we would obtain in this case one nested group for executable objects, one for bitmaps, one for sound objects and so on.

Another possible grouping could be the one based on the object size. The specification would be "based on size, create a group for size between 0 and 999 bytes, if any, a group for size 1000–1999, if any, and so on for each 1000 bytes interval". Similarly the objects could be grouped by year value (or month, or day) of the last update.

Figure 3:
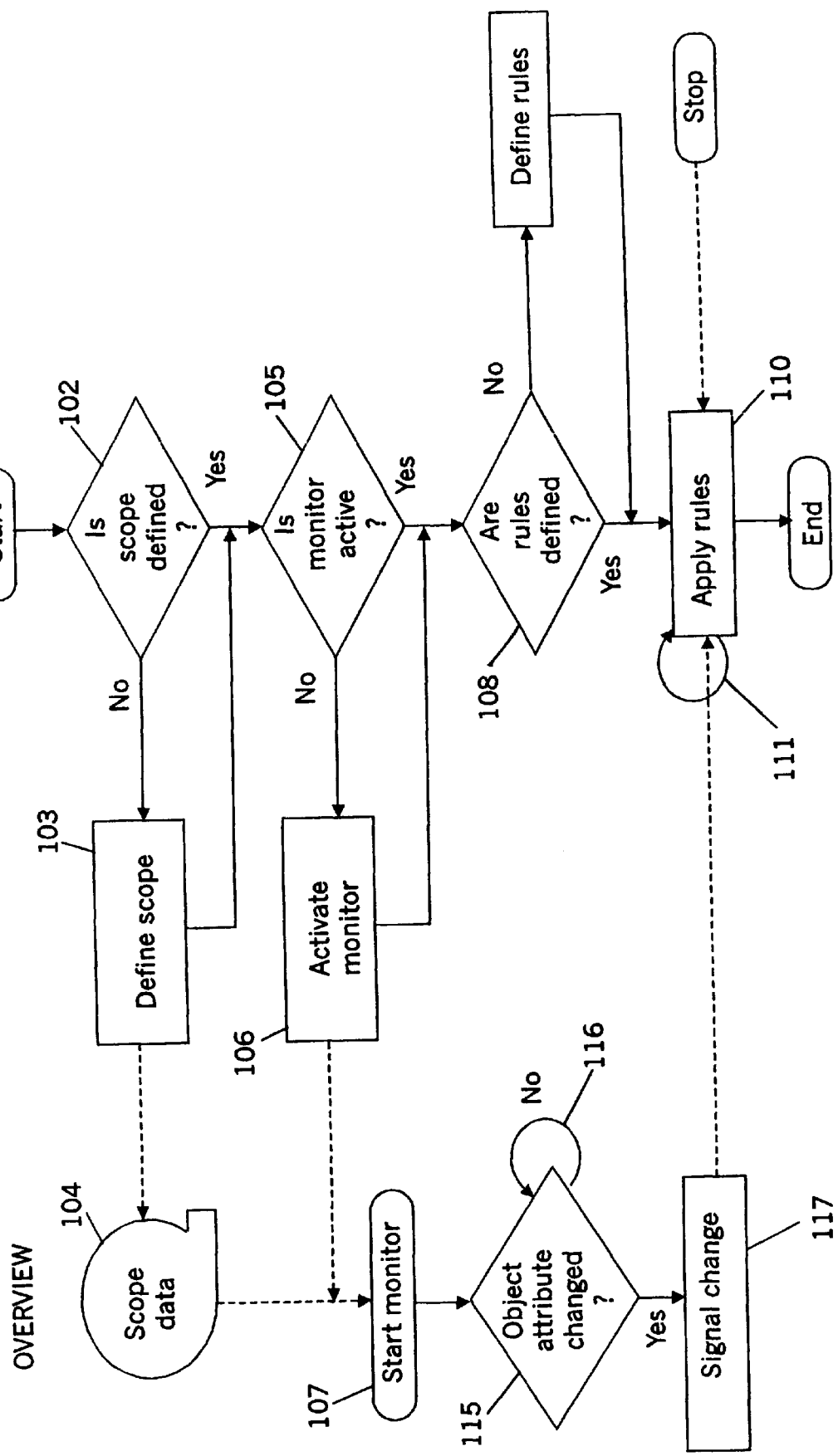
FIG. 3 shows schematically a method implementing a preferred embodiment of the present invention.

Referring now to FIG. 3 a possible method for implementing a preferred embodiment of the present invention is shown. After the start 101, the process checks whether the scope of the objects to which the grouping should be applied is defined (step 102). If not the process goes to step 103 where the scope is defined either interactively with the user or with a predefined setting in a data base 104. The scope is a description of the kind of objects to which the automatic grouping should be applied (e.g. objects representing text files). Each kind of object has a number of attributes upon which the grouping rules are built (e.g. the object name, the size, the last update, the type). At step 105 the "monitor" is checked: if it is not already active, step 106 is performed.

The monitor is a program (see steps 107, 115, 116, 117) which constantly checks whether any of the attributes of the objects belonging to the defined scope is changed or if any object is added to or deleted from the existing ones (115). The monitor can be a "sleeping" parallel process which stays in the waiting status until any change occurs to the objects (see loop 116). When a change is detected the monitor issues a signal or a message.

Steps 108 and 109 check whether the rules are defined and, if not, the user is asked to define them. Step 110 applies the rules to the object in the defined scope and this step is performed again (111) each time a message from the monitor (117) is received, which indicates that at least one of the monitored objects modified any of its attributes.

Figure 4:
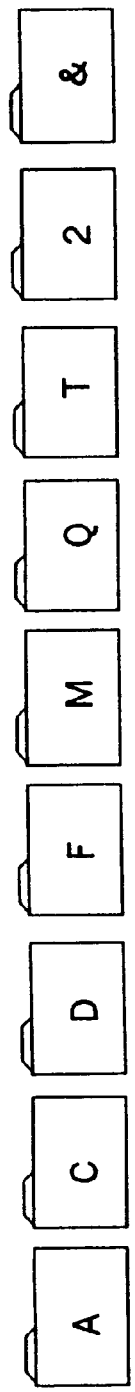
FIGS. 4–6 are examples of objects grouped according to a preferred embodiment of the present invention.
Figure 5:
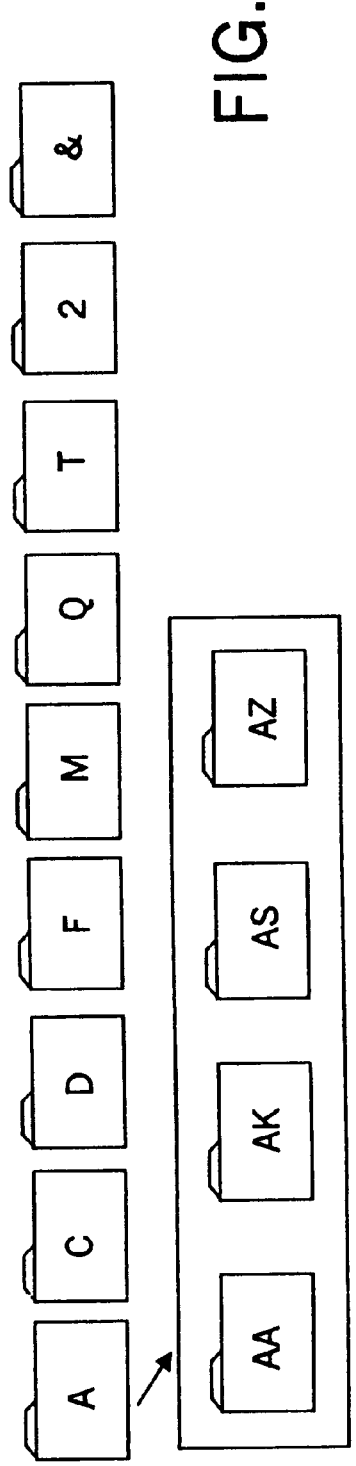
Figure 6:
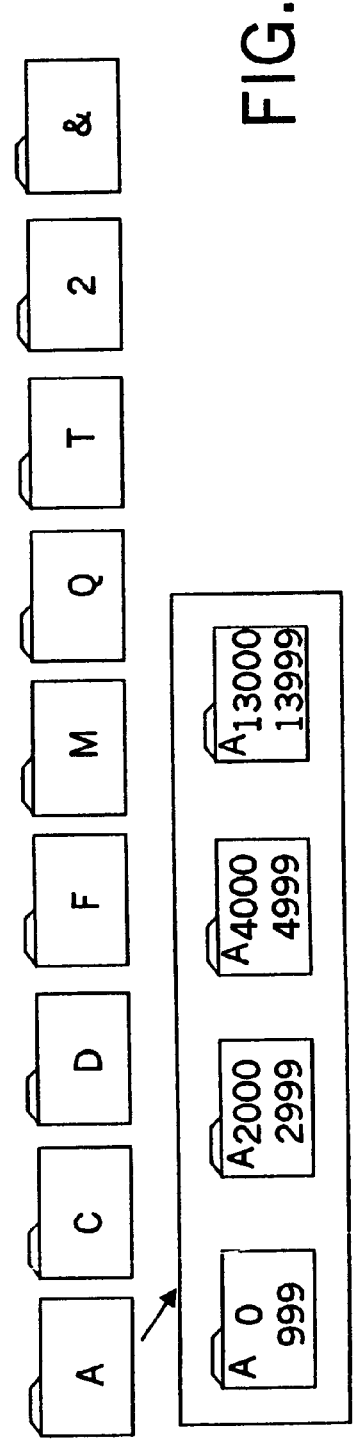

Referring now to FIG. 4–6 examples of groupings are shown. In FIG. 4 a simple alphabetical logic is applied to the existing objects. The result will be that all objects whose name has the first character "a" will be contained in folder "A" and so on. The rule could be: GROUP ON {SUBSTRING OF "name" FROM 1 TO 1} where name is the object name. Other possible rules are: GROUP ON {"type"} which generates a group for each object type; GROUP ON {RANGE OF "size" FROM 0 TO S BY 1000} which generates one group for all objects whose size is between 0 and 999 bytes, if any, one for those objects whose size is between 1000 and 1999 bytes, if any, and so on.

Additional rules and conditions could be added for better balancing the automatically created groups; for example a lower limit could be imposed below which the automatic grouping is not required: only when the number of objects exceeds such limit the automatic grouping is performed. Another example could be a minimum number of objects that a group must contain, otherwise is not created: in the example of FIG. 4, if only one object had the name beginning with "d" the group "D" would not be created.

Of course it could happen that a group itself contains too many objects and nested grouping is desirable. FIG. 5 shows an example of grouping based on the alphabetical order, where at the first level the grouping is done on the first character, while on the second level (inside "A" group) is done on the second character. In such case the rule would be as follows: GROUP ON {SUBSTRING OF "name" FROM n TO n} where "n" is the number of the level at which the grouping is performed. The same rule is so applied to each of the nested levels. A different solution is represented in FIG. 6 where the second level has a different rule from the first level. The first level is based again on the alphabetical order, while the second level is based on the object size.

Those skilled in the art will appreciate that a number of different attributes or set of attributes could be used instead of the attributes of the examples above described. It is also possible to implement the present invention in any of the existing operating system GUI with a number of different programming languages.

While the invention has been particularly shown and described with reference to a preferred embodiment and process, it will be understood that various changes in form and detail may be made therein without departing from the spirit and scope of the invention.

What is claimed is:

1. In a graphical user interface for displaying a plurality of objects, each object having a set of attributes, a method for automatically grouping the plurality of objects into at least one set, the method comprising the steps of:

obtaining a logic rule for grouping objects into at least one set of objects according to a value of at least one of said attributes;

monitoring the plurality of objects;

signaling a change when an attribute of an object of the plurality of objects changes;

applying the logic rule to the object whose attribute has changed, for placing the object whose attribute has changed, into the group of the at least one set;

repeating the applying step each time a change is signalled;

associating each of said at least one set of objects with a container;

representing each of said at least one set of objects with the associated container.

2. The method of claim 1 wherein the step of obtaining a logic rule further comprises the steps of:

determining whether a logic rule for grouping objects has been defined and stored;

obtaining the logic rule for grouping objects from storage when the logic rule has been defined and stored;

requesting a definition of a logic rule for grouping objects, from a user at the graphical user interface, when the logic rule has not been defined and stored;

storing the logic rule for grouping objects which was received from the user;

using the logic rule for grouping objects which was received from the user, in the step of applying the logic rule.

3. The method of claim 1 wherein the step of applying the logic rule further comprises the step of:

creating a subgroup of objects within the group of objects when the number of objects within the group of objects exceeds a limit number of objects, after a change of attribute of an object causes the object whose attribute changed to become one of the group of the at least one set.

4. The method of claim 3 wherein the step of applying the logic rule further comprises the step of:

deleting a subgroup of objects within the group of objects when the number of objects within the subgroup of objects becomes less, after a change of attribute of an object, than a lower limit.

5. The method of claim 4 wherein the step of applying the logic rule further comprises the step of:

creating a second subgroup of objects within the group of objects when the number of objects in the group of objects continues to exceed the limit number of objects and a change of attribute of an object allows the object whose attribute changed to remain in the group of the at least one set of objects, and the attribute of the object whose attribute has changed does not meet the logic rule for inclusion in a first subgroup.

6. The method of claim 4 wherein the step of applying the logic rule further comprises the step of:

creating a lower level subgroup of objects within the subgroup of objects when the number of objects within the subgroup of objects exceeds a limit number of objects, after a change of attribute of an object causes the object whose attribute changed to meet the logic rule for inclusion within the subgroup of objects.

7. The method of claim 6 wherein the step of creating a lower level subgroup of objects within the subgroup of objects further comprises the steps of:

obtaining a second logic rule for grouping objects to which automatic grouping is to be applied; and applying the second logic rule to the object whose attribute has changed for placing the object whose attribute has changed into the lower level subgroup of objects.

8. Method for automatically managing a group of objects, each object having a set of attributes, for display of the objects in a computer graphical user interface comprising the steps of:

obtaining a description of a kind of objects to which automatic grouping is to be applied;

obtaining a logic rule for grouping objects to which automatic grouping is to be applied into at least one set of objects according to a value of at least one of said attributes;

monitoring objects to which automatic grouping is to be applied;

signaling a change when an attribute of an object to which automatic grouping is to be applied, changes;

applying the logic rule to the object whose attribute has changed for placing the object whose attribute has changed into a subgroup set of objects of the group of objects being managed;

repeating the applying step each time a change is signalled.

9. The method of claim 8 wherein the step of obtaining a description of the kind of objects to which automatic grouping is to be applied further comprises the steps of:

determining whether the kind of objects to which automatic grouping is to be applied has been defined and stored;

obtaining the description of the kind of objects to which automatic grouping is to be applied from storage when the description has been defined and stored;

requesting a description of the kind of objects to which automatic grouping is to be applied from a user at the computer graphical user interface when the description has not been defined and stored;

storing a description, of the kind of objects to which automatic grouping is to be applied, received from the user;

using the description of the kind of objects to which automatic grouping is to be applied which was received from the user in the step of monitoring objects to which automatic grouping is to be applied.

10. The method of claim 8 wherein the step of obtaining a logic rule for grouping objects to which automatic grouping is to be applied further comprises the steps of:

determining whether a logic rule for grouping objects to which automatic grouping is to be applied has been defined and stored;

obtaining the logic rule for grouping objects the kind of objects to which automatic grouping is to be applied from storage when the logic rule has been defined and stored;

requesting a definition of a logic rule for grouping objects of the kind of objects to which automatic grouping is to be applied from a user at the computer graphical user interface when the logic rule has not been defined and stored;

storing the logic rule for grouping objects of the kind of objects to which automatic grouping is to be applied which was received from the user;

using the logic rule for grouping objects of the kind of objects to which automatic grouping is to be applied, which was received from the user, in the step of applying the logic rule.

* * * * *